Feb. 20, 1934.  M. E. GARRISON ET AL  1,947,709
WETTED SEPTUM SEPARATOR AND METHOD
Filed Feb. 16, 1931
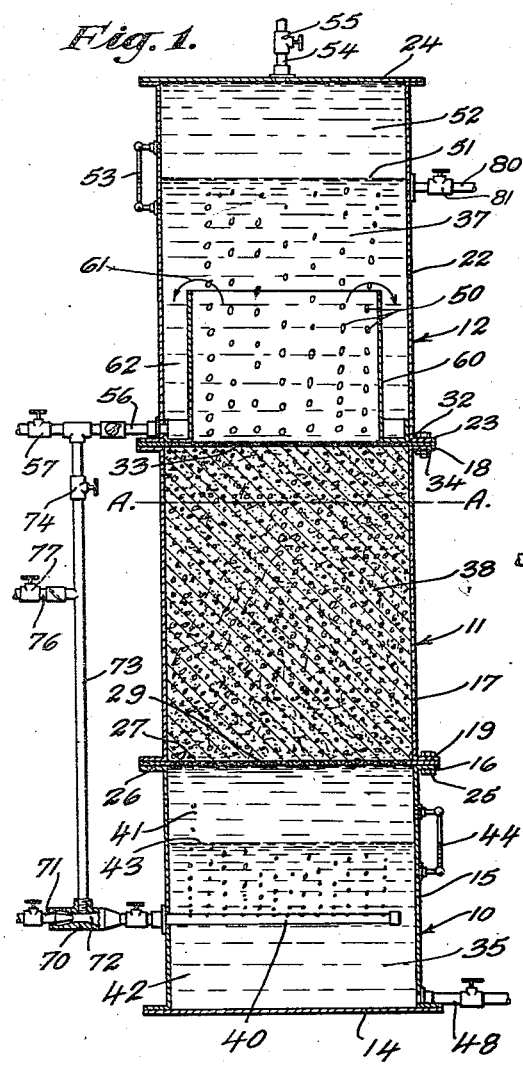
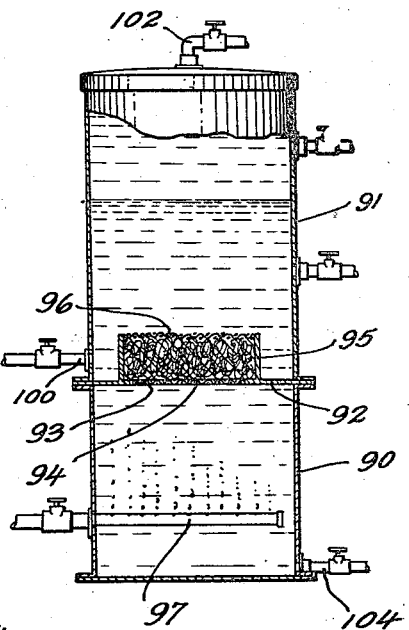
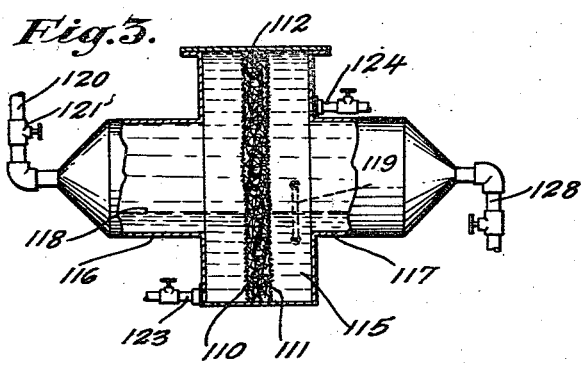
INVENTORS
MURRAY E. GARRISON
WILLIAM F. VAN LOENEN
BY
ATTORNEY.

Patented Feb. 20, 1934

1,947,709

UNITED STATES PATENT OFFICE

1,947,709

WETTED SEPTUM SEPARATOR AND METHOD

Murray E. Garrison, Los Angeles, Calif., and William F. Van Loenen, Casper, Wyo., assignors to Petroleum Rectifying Company of California, Los Angeles, Calif., a corporation of California Application February 16, 1931. Serial No. 516,141

13 Claims. (Cl. 196—4)

Our invention relates to a novel agglomerating apparatus which is especially valuable for agglomerating the dispersed phase of a petroleum emulsion.

Such an emulsion is usually in the form of minute water particles distributed throughout a body of oil, these particles forming a dispersed phase and the oil forming a continuous phase. It is with such an emulsion that we will particularly describe our process without limiting ourselves thereto.

We have found a very desirable agglomerating action takes place when such an emulsion is forced through a porous mass of a comminuted material which is preferentially wetted by the material forming the dispersed phase. Thus, glass wool has been found to be very effective in this capacity as has also "Alundum" (aluminum oxide crystallized in an electric furnace) and other materials having this preferential affinity for water. It has been found, however, that these materials must be not only preferentially wetted by water, but must be preferentially water wetted in the presence of oil, and the process hereinafter described thus differs from certain processes known to the art wherein sand and similar substances are utilized.

It is an object of this invention to provide a novel method and apparatus for agglomerating an emulsion by moving an emulsion through a comminuted mass of material which is preferentially wetted by the liquid forming the dispersed phase when in the presence of liquid forming the continuous phase.

A further object of the invention is to maintain a body of the liquid forming the dispersed phase in contact with one surface of a porous mass, whereby the dispersed material readily unites with this body of liquid after having been agglomerated by passage through the porous mass.

A further object of the invention is to provide a method and apparatus wherein a washing fluid may be made to flow through the mass of porous material in a manner to remove therefrom any foreign matter which has accumulated therein.

A further object of the invention lies in the novel apparatus wherein the comminuted material is retained between spaced interstitial members.

Still other objects lie in the particular apparatus wherein an upward flow of the emulsion through a comminuted material takes place, and wherein separation of the constituent phases takes place in the chamber immediately above the comminuted material whereby the heavier constituents contact this mass of material.

Other objects and advantages will be apparent to those skilled in the art and certain of these will be set forth more in detail hereinafter.

Referring to the drawing,—

Fig. 1 is a view illustrating the preferred form of the invention.

Fig. 2 is an alternative form of a vertical flow apparatus.

Fig. 3 is a sectional view of an agglomerating apparatus wherein the flow of fluid takes place in a horizontal direction.

In Fig. 1 we have shown an agglomerating apparatus comprising lower, intermediate, and upper sections 10, 11, and 12.

The lower section 10 is formed of a base 14 and a side wall 15 suitably secured together, this side wall providing a flange 16 at the upper end. Similarly, the intermediate section 11 provides a cylindrical side wall 17 carrying flanges 18 and 19 at its upper and lower ends respectively, while the upper section 12 provides a cylindrical side wall 22 equipped with a flange 23 at its lower end and enclosed by a cover 24 at its upper end.

Clamped between the flanges 16 and 19, as by bolts 25, is a ring 26 providing an opening 27 which is only slightly smaller in diameter than the cylindrical side wall 15. An interstitial member in the form of a screen 29 is stretched across this opening and is secured to the ring 26. A similar interstitial member 33 is associated with a ring 32 compressed between the flanges 18 and 23 as by bolts 34. The interstitial members 29 and 33 respectively cooperate with the lower and upper sections 10 and 12 in providing an intake chamber 35 and a discharge chamber 37, there being a treating chamber 38 between these members. The latter chamber is filled to a level A—A with a mass of "Alundum," glass wool, or other material which is preferentially water wetted in the presence of oil. Once the process has been set into operation, this material will expand and fill the treating chamber 38. In some instances it is desirable to position enough of the comminuted material in the chamber 38 so that when it becomes wet it completely fills this space and is, in fact, somewhat compressed due to the limited volume thereof, though in other instances it is preferable not to materially compress the comminuted material.

The emulsion to be treated is introduced into the intake chamber 35 through a spray pipe 40 having upwardly pointed openings. After a period of operation it will be found that the upper part of the intake chamber 35 is filled with a body of mixture of dry oil and emulsion, indicated by the numeral 41, while the lower portion of this chamber is filled with water 42. The normal surface of contact between these bodies of liquid is indicated by the line 43 and is indicated on the exterior of the tank by means of a gauge glass 44. The spray pipe 40 is below the level 43 so that the incoming emulsion is washed upward through the water, thus tending to wash out any water particles only loosely associated therewith, as well as certain foreign matter which drops to the bottom of the intake chamber 35, and is withdrawn through a pipe 48. This pipe may also be used to control the level 43.

The emulsion entering the intake chamber 35 is under sufficient pressure so that it forces the emulsion upward through the interstitial member 29 and through the body of comminuted material retained in the chamber 38. During this passage through the interstices of the comminuted material, the films of emulsifying material which theoretically surround each dispersed particle appear to be mechanically disrupted, thus allowing the particles to agglomerate into larger water particles which in turn associate themselves with the liquid with which the comminuted material is wetted. In view of the nature of the material utilized, this liquid is, of course, water when treating a conventional petroleum emulsion.

It has been found, however, to be desirable in most instances that one surface of this body of comminuted material be in contact with the body of liquid forming the dispersed phase. With the apparatus shown in Fig. 1, it has been found that a body of water gathers in the lower portion of the discharge chamber 37 and contacts with the upper surface of the mass of comminuted material, the oil separated from the emulsion moving upward through this body of water in the form of droplets, indicated, for instance, by the numeral 50. These droplets appear to move upward in rather definite paths, and this channeling action has been found to be very desirable. The upper surface of the body of water is indicated by the numeral 51, and when the oil particles reach this surface they move into a body of dry oil 52 retained in the upper part of the discharge chamber 37 due to its being of lower specific gravity than the water. A gauge glass 53 indicates to the operator the position of the level 51.

Dry oil is removed from the upper end of the chamber 37 through a pipe 54 containing a valve 55, while the water is removed from the lower portion of the discharge chamber 37 through a pipe 56 containing a valve 57. By controlling the relative settings of the valves 55 and 57 it is possible for the operator to control the position of the level 51.

We have found it desirable to position a cylindrical baffle 60 in the discharge chamber 37, this baffle extending upward from the interstitial member 33 and terminating a distance below the level 51, as shown in Fig. 1. This baffle assists the channeling action and conducts the oil droplets vertically upward. The water separated from the emulsion eventually moves through the path indicated by the arrow 61 and is withdrawn from the lower portion of the annular space 62 defined between the baffle 60 and the side wall 22 through the pipe 56. By the use of this baffle it has been found that a much cleaner separation of the oil and water takes place.

With certain emulsions we have found it very desirable to recirculate a portion of the water from the discharge chamber 37 into the intake chamber 35. This is preferably done by the use of a mixing device 70 communicating with the spray pipe 40, the emulsion being introduced through a nozzle 71 into a restricted orifice 72. The pressure at this point is correspondingly lowered, and water is drawn into the orifice through a pipe 73 which communicates with the orifice and with the pipe 56, this water being mixed with the incoming emulsion. A valve 74 is positioned in the pipe 73 and controls the amount of this recirculation.

Similarly, with certain emulsions we have found it desirable to introduce a modifying agent into the incoming emulsion. The modifying agents which have been found to be desirable are those which change the interfacial tension between the phases of the emulsion. Such agents are well known in the art and may be either in the form of suitable chemicals such as phenol, toluidine aminotoluene, $CH_3C_6H_4NH_2$, sodium or calcium soaps, sulphonated hydrocarbons, etc., or certain other minerals which have the characteristic of changing the interfacial tension between the phases. These substances are enumerated as examples of materials which may be used, but the list is not exhaustive and numerous other substances having desirable modifying actions can be used without departing from the spirit of the invention. The modifying agent may be most easily inserted through a pipe 76 communicating with the pipe 73, a valve 77 controlling the amount of such modifying agent introduced. The action of this modifying agent assists the agglomerating action of the comminuted mass.

After the apparatus has been in operation for some time it is found that the comminuted mass tends to become clogged with certain foreign matter, this foreign matter being usually the emulsifying agent present in the emulsion. Up to a certain point, this deposition of emulsifying agent tends to increase the agglomerating action, but such accumulation, of course, makes it necessary to use higher pressures on the incoming emulsion. It is, therefore, uneconomical to allow this deposition to go on indefinitely, and for this purpose we prefer to intermittently force a washing fluid through the body of comminuted material in the reverse direction. This may most easily be done by forcing water or other cleansing fluid through a pipe 80 providing a valve 81 and communicating with the discharge chamber 37. By closing the valves 55 and 57, this cleansing fluid moves downward through the mass of comminuted material in the chamber 38 and washes therefrom the deposited material which is carried into the intake chamber 35 whence it is removed in the pipe 48. This cleansing action is accomplished relatively easily, after which the normal method of operation may be assumed. It is also possible to remove the mass of material thereafter suitably wash it, but this procedure is usually prohibitive in cost.

Another form of apparatus is illustrated in Fig. 2 wherein the apparatus is formed by lower and upper sections 90 and 91 providing flanges between which the plate 92 is retained. This plate has an opening 93 across which an interstitial member 94 is stretched and also provides an annular wall 95 extending upward. Stretched across the upper end of this annular wall is an interstitial member 96 and the space between these members 94 and 96 is filled with comminuted material such as "Alundum," glass wool, etc. It is preferable, however, in this form of the apparatus to utilize glass wool in this capacity. Emulsion is introduced through a spray pipe 97, and is washed by moving upward through a body of water as previously described, the upper part of the lower section 90 being filled with oil and emulsion. The annular wall 95 may conveniently act in the same capacity as the baffle 60 allowing the water to be withdrawn through a pipe 100, the dry oil being removed from the upper end of the upper section 91 through a pipe 102. The washing of the comminuted material may be accomplished by forcing water into the upper section 91 and removing it through a pipe 104 communicating with the lower end of the lower section 90, this fluid washing through the comminuted material and removing the deposited material.

In Fig. 3, we have illustrated another form of the invention wherein two interstitial members 110 and 111 are vertically positioned and so spaced as to provide a treating chamber 112 filled with a comminuted material. These interstitial members extend completely across a large chamber 115 communicating with end bells 116 and 117 of smaller size. A body of water is maintained in the lower part of the apparatus, the surface of this body of water being indicated by the numeral 118 and being maintained by the use of a gauge glass 119. This level is below the horizontal center line of the end bells 116 and 117, and the emulsion to be treated is introduced through a pipe 120 containing a valve 121. In this form of the invention the incoming emulsion is not washed through a body of water, but is forced into the space above the level 118 and is moved through the body of comminuted material. The water associates itself with this comminuted material and drops downward therethrough until it joins the body of water in the bottom of the apparatus, enough of this water being withdrawn through a pipe 123 to maintain the level 118 constant. The dry oil passes through the comminuted material and is removed through a pipe 124. Backwashing is attained by forcing the washing liquid through a pipe 128, the foreign matter being removed through the pipe 123.

Any of the above forms may often be used to treat emulsion from a suitable storage, but can also be used to good advantage if attached to the flow line of a well, either before or after the liquid has passed through a gas trap.

It is an important feature of this invention that the comminuted material be one which will be preferentially wetted by water. In addition, however, this preferential wetting must take place even in the presence of oil, or other material forming the continuous phase.

Another important feature of the invention is that one surface of this body of comminuted material must be in contact with the body of liquid forming the dispersed phase. In the apparatus shown in Figs. 1 and 2 this is accomplished by maintaining the body of water in the discharge chamber, this water contacting the upper surface of the mass of comminuted material and allowing the oil to bubble therethrough. In the form shown in Fig. 3, however, the entire lower surface of the mass of comminuted material is contacted by the water. With some emulsions this horizontal flow of the emulsion is especially desirable. This is apparently due to the fact that the water separated from the emulsion moves through the mass of comminuted material in a direction which is at right angles to the flow of incoming emulsion.

While we have described our process and apparatus as being particularly applied to a petroleum emulsion of water in oil, it should be understood that we are not limited to this particular combination.

We claim as our invention:

1. A method of agglomerating the dispersed phase of a petroleum emulsion which includes the steps of: moving said emulsion through a porous mass of comminuted aluminum oxide crystallized in an electric furnace whereby the dispersed phase of said emulsion is agglomerated on said porous mass of comminuted material; and maintaining a body of the liquid forming said dispersed phase in contact with one surface of said porous mass.

2. A method of agglomerating the dispersed phase of a petroleum emulsion which includes the steps of: moving said emulsion through a porous mass of a comminuted material which is preferentially wetted by said dispersed phase when in the presence of the continuous phase of said emulsion; maintaining a liquid body of said dispersed phase in contact with a surface of said porous mass; and recirculating a portion of said liquid body into the incoming emulsion.

3. A method of agglomerating the dispersed phase of a petroleum emulsion which includes the steps of: moving said emulsion through a porous mass of a comminuted material which is preferentially wetted by said dispersed phase when in the presence of the continuous phase of said emulsion; maintaining a liquid body of said dispersed phase in contact with a surface of said porous mass; and introducing a treating agent capable of modifying the interfacial tension of said emulsion into the incoming emulsion.

4. A method of agglomerating the dispersed phase of an emulsion, which includes the steps of: moving said emulsion upward through a porous mass of a material which is preferentially wetted by said dispersed phase when in the presence of the continuous phase of said emulsion whereby said dispersed phase is agglomerated; gravitationally separating said phases in a separating zone immediately above said porous mass whereby said dispersed phase forms a body of liquid contacting the upper surface of said porous mass and through which body of liquid the liquid forming said continuous phase must pass; and separately withdrawing the liquid of said phases from the separating zone immediately above said porous mass.

5. A method of agglomerating the dispersed water phase of a petroleum emulsion the continuous phase of which is oil, which method includes the steps of: washing said emulsion; forcing the washed emulsion through a porous mass; maintaining in contact with one surface of said porous mass a body of the water forming said dispersed phase, the dispersed phase of said emulsion uniting with this body of water; withdrawing a portion of said body of water in contact with said porous mass; and mixing this portion of said body of water with the incoming emulsion prior to the time that this emulsion is washed.

6. A method of agglomerating the dispersed water phase of a petroleum emulsion the continuous phase of which is oil, which method includes the steps of: washing said emulsion; forcing the washed emulsion through a porous mass; maintaining in contact with one surface of said porous mass a body of the water forming said dispersed phase, the dispersed phase of said emulsion uniting with this body of water; withdrawing a portion of said body of water in contact with said porous mass; introducing into this withdrawn portion of said body of water a treating agent capable of modifying the interfacial tension of said emulsion; and mixing said withdrawn portion and its associated treating agent with the incoming emulsion prior to the time that this emulsion is washed.

7. In combination in an apparatus for agglomerating the dispersed phase of an emulsion: a pair of vertically spaced interstitial members providing a chamber therebetween; a mass of loose comminuted material disposed in said chamber; means for moving said emulsion upward through said chamber, whereby said dispersed phase is agglomerated; and walls forming a discharge chamber directly above the upper of said interstitial members in a manner to retain a body of the liquid forming said dispersed phase immediately above said mass of comminuted material, whereby the dispersed particles agglomerated by said mass of comminuted material unite with said body of liquid, and through which body of liquid the lighter phase of said emulsion must pass.

8. In combination in an agglomerating apparatus: a lower section providing an intake chamber; an upper section providing a discharge chamber; means for retaining a mass of loose comminuted material between said upper and said lower sections; means for forcing a stream of emulsion to be treated upward through said mass of material, whereby said emulsion tends to separate into its constituent parts in said discharge chamber; and means for separately withdrawing said constituents from said discharge chamber.

9. A combination as defined in claim 8 including a baffle extending upward in said discharge chamber to conduct the products separated by said comminuted material, and in which the heavier constituent is withdrawn from an annular space between said baffle and the inner wall of said upper section.

10. In combination in an apparatus for agglomerating the dispersed phase of a petroleum emulsion: walls defining an intake chamber, a treating chamber, and a discharge chamber, superimposed one above the other; a mass of loose comminuted material disposed in said treating chamber and formed of a material which is preferentially wetted by said dispersed phase of said emulsion; and means for introducing said emulsion into said intake chamber, said emulsion moving upward through said mass of comminuted material, said discharge chamber containing a body of the liquid forming said dispersed phase, said liquid contacting the upper surface of said mass of comminuted material, the dispersed particles uniting with said body of liquid.

11. In combination in an apparatus for agglomerating the dispersed phase of a petroleum emulsion: walls defining an intake chamber, a treating chamber, and a discharge chamber, superimposed one above the other; a mass of loose comminuted material disposed in said treating chamber and formed of a material which is preferentially wetted by said dispersed phase of said emulsion; means for introducing said emulsion into said intake chamber, said emulsion moving upward through said mass of comminuted material, said discharge chamber containing a body of the liquid forming said dispersed phase, said liquid contacting the upper surface of said mass of comminuted material, the dispersed particles uniting with said body of liquid; and means for recycling a portion of said body of liquid into said intake chamber.

12. In combination in an apparatus for agglomerating the dispersed phase of a petroleum emulsion: walls defining an intake chamber, a treating chamber, and a discharge chamber superimposed one above the other; a mass of loose comminuted material disposed in said treating chamber and formed of a material which is preferentially wetted by said dispersed phase of said emulsion; means for introducing said emulsion into said intake chamber, said emulsion moving upward through said mass of comminuted material, said discharge chamber containing a body of the liquid forming said dispersed phase, said liquid contacting the upper surface of said mass of comminuted material, the dispersed particles uniting with said body of liquid; means for recycling a portion of said body of liquid into said intake chamber; and means for introducing a treating agent into that portion of said body of liquid which is re-cycled into said intake chamber.

13. In combination in an agglomerating apparatus for emulsions: walls forming an intake chamber; means for introducing emulsion into said intake chamber, said emulsion filling the upper end of said intake chamber; means for withdrawing water which settles to the bottom of said intake chamber; walls forming a discharge chamber above said intake chamber; a porous mass of material through which said chambers are in communication, said porous mass being contacted on its lower end by said emulsion in said intake chamber and being contacted on its upper end by a body of the liquid forming the dispersed phase of said emulsion and retained in said discharge chamber, the material forming the continuous phase of said emulsion moving upward through said body of liquid and into the upper end of said discharge chamber; and means for separately withdrawing said phases from said discharge chamber.

MURRAY E. GARRISON.
WILLIAM F. VAN LOENEN.